US006880772B2

(12) United States Patent
Schlesiger et al.

(10) Patent No.: US 6,880,772 B2
(45) Date of Patent: Apr. 19, 2005

(54) PROCESS AND APPARATUS FOR COMBINED MILLING AND DRYING

(75) Inventors: Hartwig Schlesiger, Fallingbostel (DE); Martin Morning, Zschepplin (DE); Gerd Sonnenberg, Walsrode (DE); Rudolf Heidemann, Walsrode (DE)

(73) Assignee: Wolff Walsrode AG, Walsrode (DE)

( * ) Notice: Subject to any disclaimer, the term of this patent is extended or adjusted under 35 U.S.C. 154(b) by 113 days.

(21) Appl. No.: 10/277,514

(22) Filed: Oct. 22, 2002

(65) Prior Publication Data

US 2003/0122003 A1 Jul. 3, 2003

(30) Foreign Application Priority Data

Oct. 26, 2001 (DE) .......................................... 101 52 991

(51) Int. Cl.$^7$ .......................... B02C 11/08; B02C 21/00
(52) U.S. Cl. .............................. 241/23; 241/21; 241/22; 241/24.11; 241/57; 241/60; 241/62; 241/65; 536/124
(58) Field of Search .............................. 241/21, 22, 23, 241/24.11, 57, 60, 62, 65; 536/124

(56) References Cited

U.S. PATENT DOCUMENTS

| | | | | |
|---|---|---|---|---|
| 4,979,681 A | * | 12/1990 | Donges et al. ................ | 241/17 |
| 5,921,479 A | * | 7/1999 | Doenges et al. ............... | 241/18 |
| 6,021,966 A | * | 2/2000 | Doenges et al. ............... | 241/57 |
| 6,320,043 B1 | * | 11/2001 | Weber et al. ................. | 536/84 |
| 6,685,117 B1 | * | 2/2004 | Poeschl ....................... | 241/48 |

* cited by examiner

Primary Examiner—Allen Ostrager
Assistant Examiner—Jason Pahng
(74) Attorney, Agent, or Firm—Joseph C. Gil; James R. Franks

(57) ABSTRACT

A process of both milling and drying a solvent-moist material (e.g., water-moist methylhydroxyethylcellulose) is described. The process includes, (a) providing a mill-dryer (100) which includes, in series, a heat exchanger (1), a mill (2) and a particulate separating apparatus (105) connected by conduits (8), (9) and (11, 12), which together define a mill-dryer circuit (103). The mill-dryer (100) also includes a bypass conduit (14), which provides optionally at least partial gaseous bypass of the heat exchanger (1). The process further includes: (b) introducing the solvent-moist material into the mill (2); (c) circulating a vapor stream (e.g., a steam/air stream) throughout the mill-dryer circuit (103); (d) heating the vapor stream by means of passage through the heat-exchanger (1); (e) forwarding milled particulate material from the mill (2) to the particulate separating apparatus (105) by means of conduit (9); (f) separating the particulate material from the vapor stream in the particulate separating apparatus (105); (g) forwarding the vapor stream from the particulate separating apparatus (105) through conduits (11, 12); and (h) controlling the temperature of the vapor stream by optionally forwarding at least some of the vapor stream through the bypass line (14).

10 Claims, 1 Drawing Sheet

PROCESS AND APPARATUS FOR COMBINED MILLING AND DRYING

CROSS REFERENCE TO RELATED PATENT APPLICATION

The present patent application claims the right of priority under 35 U.S.C. §119 (a)–(d) of German Patent Application No. 101 52 991.0, filed Oct. 26, 2001.

FIELD OF THE INVENTION

The invention described here relates to a process and an apparatus for avoiding overheating and hence reductions in product quality and/or material damage during combined milling and drying in a circulation-gas mill-dryer.

BACKGROUND OF THE INVENTION

EP-A-0 835 882 describes a process and an apparatus for the simultaneous milling and drying of moist cellulose ether. In the case of the process and the apparatus, a gas stream is divided into three partial gas streams. Although the gas stream is optionally recycled, EP-A-0 835 882 gives no instruction as to how overheating can be counteracted in the case of the circulation gas procedure. Furthermore, a condenser is used in the circulation in the circulation gas procedure, so that steam cannot be used as a carrier gas.

EP-A-0 227008 describes a process and a device for operating a milling plant. The application relates to a process for operating a milling plant through which the product and a carrier gas flows, in which process a circulated inert gas is used as the carrier gas. In the case of this process, only the milling of a material to be milled is described. Combined milling and drying by a superheated carrier gas is not envisaged.

WO 98/31710 describes a mill-dryer for the preparation of polysaccharide derivative powders, dissolved or swollen polysaccharide derivatives being used as the material to be milled. The dissolved or swollen polysaccharide derivative is comminuted by repeated impact and/or shear stress between rotating and stationary or counter-rotating grinding tools and/or by impact of a plurality of particles. At the same time, the water present in the solid is evaporated. The thermal energy required for this purpose is only partly introduced by superheated steam. The electrical energy of the mill drive, which is converted into heat by friction, simultaneously contributes towards the drying. The finely divided solid particles are separated from the gas stream in a separator downstream of the mill-dryer. Said separator may be a centrifugal separator, such as, for example, a cyclone, or a filter separator. Depending on the mill design, classification by screening can already be effected internally. Any granular fraction present is separated from the fine material as a result of the centrifugal force predominating over the drag forces of the transport gas. The fine material is discharged as finished product from the milling chamber with the transport gas. The granules are recycled to the milling zone in an internal or external granule recycling. Alternatively or in addition, it may be expedient to install a further downstream classification stage involving screening or preferably sieving. The coarse fraction separated off there can optionally be recycled to the mill or mixed with the feed.

The temperature of the steam required for combined milling and drying by means of superheated steam is chosen so that the temperature does not fall below the dew point anywhere, depending on the chosen product throughput and/or the amount of water in the polysaccharide derivative. By using water in the combined milling and drying by means of superheated steam, an oxygen-poor atmosphere is achieved inside the mill-dryer.

In a variant of the process, superheated steam is circulated and the excess superheated steam is discharged as a partial steam stream. A heat exchanger which heats the circulation gas stream to the temperature required for the combined milling and drying is installed before the mill-dryer.

In practice, a circulation gas procedure proves problematic since there is no longer any consumer for the thermal energy in the event of the absence of or a sudden drop in the stream of material to be milled. Even if the heating power of the heat exchanger is spontaneously minimized, such as, for example, by extinguishing the burner flame, the energy stored in the heat exchanger is sufficient for substantially heating up the total circulation of the combined milling and drying. This heating-up continues to such an extent that product adhesions in the mill or residual products in the cyclone or filter separator decompose and the product quality of the subsequently produced product is reduced. Furthermore, in the event of strong heating of the filter materials, fires or at least melting of the filter may occur, with considerable material damage.

In order to avoid such disadvantages, according to the prior art a cooling medium which acts as a consumer in place of the material to be milled is used. Such a consumer may be, for example, air or nitrogen. Another possibility consists, for example, of spraying in water directly behind the heat exchanger in order to consume the excess energy through evaporation. Various disadvantages are associated with these cooling methods; thus, with the use of air, displacement of the steam atmosphere in the mill occurs and this may result in oxidation of product adhesions and residual product. In the extreme case, fires and explosions may result.

The use of nitrogen as a coolant is very expensive and large amounts of nitrogen may constitute a considerable safety risk for people (e.g., asphyxiation due to lack of oxygen in the event of leaks).

Furthermore, gases such as air or nitrogen have a low heat capacity so that the cooling effect is only small.

Spraying in water is technically very complicated; large amounts of water have to be sprayed and it is necessary to ensure that pools of water do not occur in the plant, subsequently leading to considerable product adhesions. In order to avoid incrustations on the nozzles due to salts contained in the water, demineralized water has to be used.

Common to all cooling methods is the fact that they are uneconomical since the energy stored in the plant is discharged unused and has to be reintroduced on resumption of production.

Another aspect common to all cooling methods is that, when the stream of material to be milled is still present but greatly reduced, they intervene significantly in the result of the combined milling and drying by changing the composition of the circulation gas and hence adversely affect the product quality.

SUMMARY OF THE INVENTION

It is therefore the object of the present invention to provide a process for combined milling and drying, in which overheating and hence reductions of product quality are avoided.

This object is achieved by circumventing the heat exchanger by means of a bypass and reintroducing the superheated steam stream into the circulation downstream of the heat exchanger.

The invention therefore relates to a process for combined milling and drying, in which a solvent-moist material to be milled is comminuted in a mill (2) by means of a steam stream circulated over the total mill-dryer and heated by means of a heat exchanger (1), and the milled particles obtained are separated from the steam stream in a separating apparatus (3, 4) downstream of the mill (2), characterized in that all or some of the steam stream can be caused to circumvent the heat exchanger (1) by means of a bypass line (14).

In accordance with the present invention, there is provided a process of both milling and drying a solvent-moist material comprising:

(a) providing a mill-dryer apparatus (100) comprising,
   (i) a heat exchanger (1) having an inlet (42) and an outlet (45),
   (ii) a mill (2) having an inlet (36) and an outlet (39),
   (iii) a particulate separating apparatus (105, which may include a cyclone separator 3 connected in series, by means of a cyclone separator-filter separator conduit 10, with a filter separator 4) having an inlet (48) and an outlet (51), and
   (iv) a bypass line (14),
   the outlet (45) of said heat exchanger (1) being connected to the inlet (36) of said mill (2) by means of a heat exchanger-mill conduit (8),
   the outlet (39) of said mill (2) being connected to the inlet (48) of said particulate separating apparatus (105) by means of a mill-separator conduit (9),
   the outlet (51) of said particulate separating apparatus (105) being connected to the inlet (42) of said heat exchanger (1) by means of a separator-heat exchanger conduit (11, 12),
   said heat exchanger (1), mill (2), particulate separating apparatus (105), heat exchanger-mill conduit (8), mill-separator conduit (9) and separator-heat exchanger conduit (11, 12) together defining a mill-dryer circuit (103), said mill-dryer circuit (103) having up-stream and downstream portions relative to said heat exchanger (1), and
   said bypass line (14) providing reversibly closeable gaseous communication between said separator-heat exchanger conduit (11, 12) and a down-stream portion of said mill-dryer circuit (e.g., heat exchanger-mill conduit 8) relative to said heat exchanger (1), said bypass line (14) thereby providing optionally at least partial gaseous bypass of said heat exchanger,
(b) introducing said solvent-moist material into said mill (2);
(c) circulating a vapor stream throughout said mill-dryer circuit (103);
(d) heating said vapor stream by means of passage through said heat-exchanger (1);
(e) forwarding milled particulate material from said mill (2) to said particulate separating apparatus (105) by means of said vapor stream and said mill-separator conduit (9);
(f) separating said particulate material from said vapor stream in said particulate separating apparatus (105);
(g) forwarding said vapor stream from said particulate separating apparatus (105) through said separator-heat exchanger conduit (11, 12); and
(h) controlling the temperature of said vapor stream by optionally forwarding at least some of said vapor stream through said bypass line (14).

In an embodiment of the present invention, a control valve (19) which reduces or prevents further flow through the heat exchanger (1) as required and passes all or some of the gas stream through the bypass (14) is provided upstream of the heat exchanger and downstream of the branching point (33) of the bypass line (14). Furthermore, a control valve (18) can be provided in the bypass line so that the bypass (14) can be completely or partly closed during the combined milling and drying operation. The integration of the bypass (14) downstream of the heat exchanger can alternatively be effected between heat exchanger and mill (e.g., at point 54 in conduit 8 by means of a combination of conduits 14 and 17), into the mill (e.g, by means of conduit 15), or downstream of the mill (e.g., by means of conduit 16).

In accordance with the present invention, there is also provided a mill-dryer apparatus (100) as described above.

The features that characterize the present invention are pointed out with particularity in the claims, which are annexed to and form a part of this disclosure. These and other features of the invention, its operating advantages and the specific objects obtained by its use will be more fully understood from the following detailed description and the accompanying drawings in which preferred embodiments of the invention are illustrated and described.

Other than in the examples, or where otherwise indicated, all numbers or expressions, such a those expressing structural dimensions, etc, used in the specification and claims are to be under stood as modified in all instances by the term "about."

DETAILED DESCRIPTION OF THE INVENTION

Figure 1:
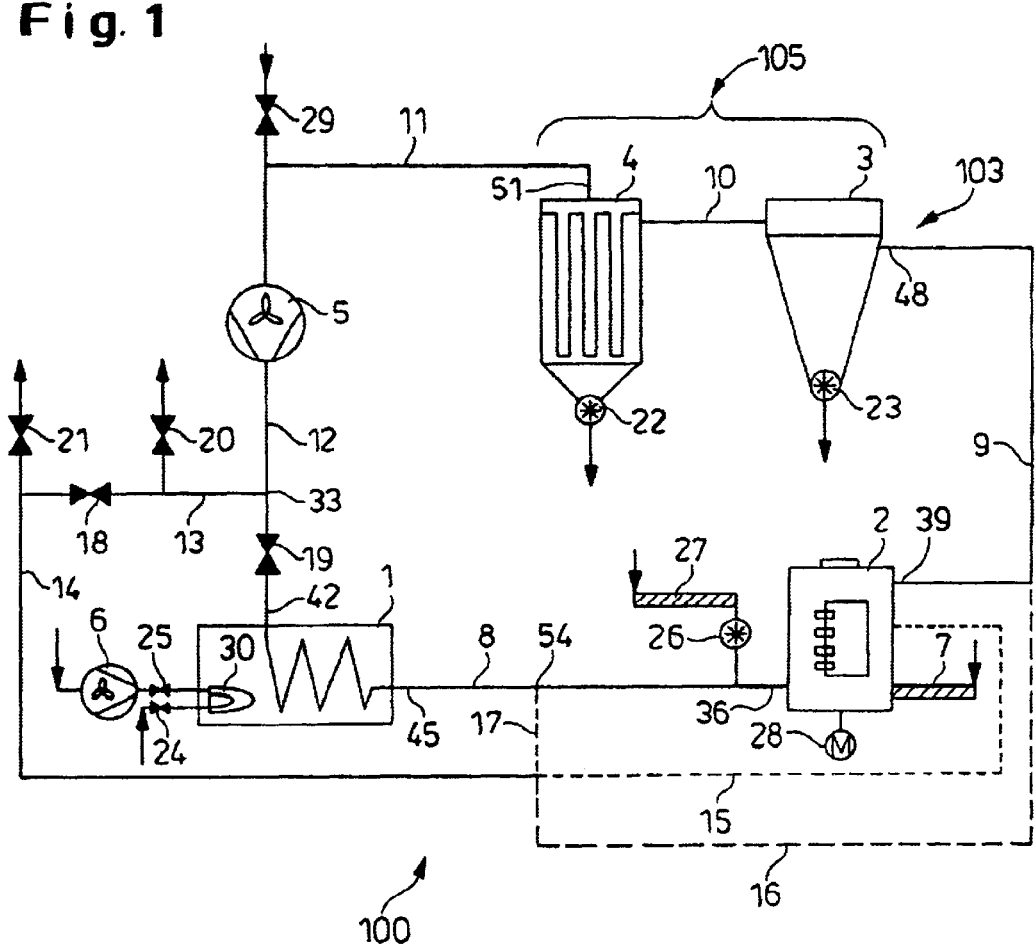
FIG. 1 is a schematic representation of a mill-dryer apparatus (100) according to the present invention.

During the combined milling and drying operation, solvent, preferably water, is continuously evaporated and has to be discharged as a part-stream from the mill-dryer when a steam atmosphere is present. For complete shutdown (e.g., maintenance, repairs) of the mill-dryer, it must furthermore be possible to displace the steam, for example by means of air or nitrogen. This possibility can advantageously be realized by a blow-out nozzle inside the bypass line. The blow-out nozzle must in this case likewise be closable by means of a control valve. The blow-out nozzle can be arranged upstream or downstream of the control valve (18) of the bypass line (14). Alternatively, two blow-out nozzles (20, 21) may also be provided. The introduction of air or nitrogen is advantageously effected on the suction side of the fan (5) which ensures circulation of the circulation gas stream.

It is therefore the object of the present invention to provide a process for combined milling and drying, in which overheating and hence reductions of product quality are avoided.

Control valves which may be used in the mill-dryer of the present invention include, for example, valves, flap valves, throttles or slide valves.

Surprisingly, the following problems are solved by the process according to the invention: quality reduction by change of composition of the circulation gas; elimination of the inert conditions on cooling with air; removal of the energy stored in the heat exchanger to the environment; and overheating of plant parts downstream of the heat exchanger with the risk of product decomposition and material damage.

Such a mill-dryer (100) is operated in such a way that, during normal operation, the energy introduced into the circulation (103) and hence into the material to be milled is regulated by means of a burner flame (not shown). If the flow of the material to be milled greatly decreases, the burner flame is reduced to a pilot flame. The bypass control valve (18) and the control valve (19) of the main gas line (12) are opened or closed in a controlled manner so that the introduction of energy into the circulation (103) is determined (or controlled) thereby. In this case, the heat exchanger (1) acts as a heat store. If the control valve (19) of the main gas line (12) is completely or virtually completely closed, the pilot flame (not shown) is also extinguished and optionally the amount of circulation gas is reduced via a reduction in the speed of the circulation gas fan (5). The carrier gas present in the mill-dryer (100) is not displaced by air, so that the inert conditions are maintained at all times. For starting up the mill-dryer again, the bypass control valve (18) is closed in a controlled manner and the control valve (19) of the main gas line (12) is opened in a controlled manner. If the energy introduced into the circulation when the control valve of the main gas line (19) is fully opened is insufficient, additional energy is introduced via the burner flame (not shown). The regulation of the energy introduction is accordingly effected differently in the modes described: firstly, via the burner flame and secondly via the degree of opening of the bypass control valve (18) and of the control valve (19) of the main gas line (12). The temperatures of the carrier gas (vapor) stream between heat exchanger (1) and mill (2), and downstream of the mill (2), are used as control variables for regulation.

Optionally, the bypass control valve (18) can be omitted or can be permanently opened if the bypass line (14) is dimensioned in such a way that more than 80% of the volume flow flows through the heat exchanger (1) when the control valve (19) of the main gas line (12) is open.

Integration of the bypass line (14) and hence recycling of the carrier gas stream can be effected: downstream of the heat exchanger (1); or alternatively between heat exchanger and mill at point (54) in conduit (8) by means of conduit (17); into mill (2) by means of conduit (15); or downstream of mill (2) by means of conduit (16) which intersects conduit (9). Integration of the bypass line (14) between heat exchanger (1) and mill (2) (e.g., at point 54 in conduit 8 by means of conduit 17) is preferred, integration as close as possible before mill (2) (i.e., upstream of the mill) being particularly preferred.

The control valve (19) of the main gas line (12) may optionally not be completely closed. Consequently, residual convection is maintained in the heat exchanger (1). The amount of transient gas which is furthermore conveyed through the heat exchanger is typically 1 to 15% of the amount of gas which is usually conveyed through the heat exchanger. Preferably, an amount of transient gas of 2 to 8% is typically established.

The combustion air fan (6) is also preferably allowed to continue running when the burner flame and pilot flame (associated with burner 30) have been extinguished, in order to avoid accumulation of heat and local overheating in the region of the burner (30) and of the heat exchanger (1).

The composition of the carrier gas in the circulation (103) can be controlled via the intake control valve (29) during the operation of the mill-dryer. Preferably, a steam/air mixture is used as carrier gas, the steam being introduced (and formed) by means of the water-moist material to be milled and the air being introduced via the intake control valve (29).

Optionally, such a bypass procedure can be combined with cooling methods known to the skilled artisan. In this case, water would preferably be sprayed in downstream of the heat exchanger (1) in order to consume excess energy by evaporation.

In such a mill-dryer, water-moist materials to be milled are preferably dried. For example, water-moist polysaccharides and/or polysaccharide derivatives are particularly preferably used. Most preferably, water-moist cellulose derivatives selected from at least one of methylcellulose, methylhydroxyethylcellulose, methylhydroxypropylcellulose, hydroxyethylcellulose and carboxymethylcellulose are used. Among the cellulose derivatives, particularly preferably methylhydroxyethylcellulose and methylhydroxypropylcellulose are suitable, which are used with a water content of 80 to 55% by weight, relative to the total weight, preferably with a water content of 75 to 65% by weight, relative to the total weight.

In the case of a pasty consistency, the material to be milled can be transported directly into the grinding chamber (i.e., mill 2) by a conveying means (7), for example a twin screw or single screw conveying device. Flowable products are preferably introduced into the hot carrier gas stream upstream of the mill, for example via a star wheel (26).

The material to be milled is comminuted by repeated impact and/or shear stress between the rotating and stationary or counter-rotating grinding tools and/or by impact of several particles in the mill (2) and simultaneously dried. The thermal energy required for this purpose is introduced only partly by the superheated carrier gas. The electrical energy of the mill drive, which is converted into heat by friction, simultaneously contributes towards the drying. Mills that may be used in the process of the present invention include, for example, sieveless mills of the Ultra-Rotor type (e.g., from Jäckering) or Turbofiner (e.g., from Pallmann) or Super-Rotor (e.g., from Görgens).

The finely divided solid particles are separated from the gas stream in a separator (105) downstream of the mill (2). The separator (105) may include a centrifugal separator, such as, for example, a cyclone (3), or a filter separator (4). In a preferred embodiment of the present invention, separator (105) includes a filter separator (4) being positioned downstream of a cyclone (3), and connected to cyclone (3) by means of conduit (10).

Depending on the mill design, classification by screening may already be effected internally. Any granular fraction present is separated from the fine material because a centrifugal force predominates over the drag forces of the carrier gas. The fine material is discharged from the mill as finished product with the transport gas. The granules are recycled to the milling zone in an internal or external granule recycling (not shown).

Alternatively or in addition, it may be expedient to provide a further downstream classification stage (not shown) involving screening or preferably sieving. The coarse fractions separated off there can optionally be recycled to the mill or mixed with the feed (not shown).

After the milled and dried product has been separated off, the carrier gas (or vapor stream) is conveyed by means of a fan (5) into a circulation gas heater (heat exchanger 1).

Between the fan (5) and the circulation gas heater (heat exchanger 1), the gas line (13) is connected to the bypass control valve (18). An outlet control valve via which a part-gas stream is discharged from the circulation is connected upstream or downstream of this control valve. Optionally, two outlet control valves can also be provided upstream (20) and downstream (21) of the bypass control valve (18). In normal operation, exactly the amount of circulation gas which is formed through evaporation of the moist milled material during the combined milling and drying is discharged by means of said valves. Thus, these discharge control valves additionally serve for pressure regulation in the circulation (103) of the mill-dryer (100). Preferably, the mill-dryer (100) is operated in the range from −150 mbar to +150 mbar, relative to ambient pressure. However, when all plant parts are designed to be pressure-resistant, the mill-dryer (100) can also be operated at a pressure level greater than +150 mbar, relative to ambient pressure.

A preferably used circulation gas heater is a heat exchanger (1) having a natural gas burner (30). Instead of a natural gas burner (30) and heat exchanger (1), it is also possible to use a steam-operated or electrically operated heating or temperature-controlling element (not shown). In the circulation gas heater, the carrier gas is heated to the temperature required for drying the milled material. In the case of the water-moist polysaccharide derivatives described above, the carrier gas (vapor stream) is heated to a temperature of 150 to 350° C., preferably 180 to 270° C., depending on the required drying performance.

Depending on the mill, the grinding tools and the conditions for the combined milling and drying, such a mill-dryer can be used for the formation of: very fine powders (mean particle size <70 μm); fine powders (e.g., having a mean particle size of 70–150 μm); powders (e.g., having a mean particle size of 150–400 μm); and granules (e.g., having a mean particle size of >400 μm).

FIG. 1: Description of Enumerated Elements
1. Heat exchanger
2. Mill
3. Cyclone separator
4. Filter separator
5. Circulation gas fan
6. Combustion air fan
7. Product feed for pasty products
8. Main gas line (heat exchanger—mill)
9. Main gas line (mill—cyclone separator)
10. Main gas line (cyclone separator—filter separator)
11. Main gas line (filter separator—circulation gas fan)
12. Main gas line (circulation gas fan—heat exchanger)
13. Gas line (main gas line—bypass control valve)
14. Bypass line
15. Bypass line (mill feed)
16. Bypass line (feed to main gas line mill-cyclone separator)
17. Bypass line (feed to main gas line heat exchanger-mill)
18. Bypass control valve
19. Control valve of main gas line
20. Outlet control valve 1, circulation gas part-stream
21. Outlet control valve 11, circulation gas part-stream
22. Star wheel of filter separator (product discharge)
23. Star wheel of cyclone separator (product discharge)
24. Natural gas control valve
25. Combustion air control valve
26. Star wheel for product feed for flowable products
27. Product feed for flowable products
28. Mill drive
29. Air/nitrogen intake control valve
30. Burner
33. Branching point of the bypass line (14) from conduit (12)
36. Inlet of mill (2)
39. Outlet of mill (2)
42. Inlet of heat exchanger (1)
45. Outlet of heat exchanger (1)
45. Inlet of particulate separating apparatus (105)
51. Outlet of particulate separating apparatus (105)
54. Connection point of conduit (17) with conduit (8)
100. The mill-dryer in toto
103. The mill-dryer circuit
105. The particulate separating apparatus comprising cyclone separator (3) and filter separator (4) connected by means of conduit (10)
106. Valve

EXAMPLES

Example 1

Methylhydroxyethylcellulose in the form of a water-moist material to be milled was subjected to combined milling and drying in a mill-dryer operated with circulation gas. The mill-dryer corresponded very substantially to the drawing but there was no bypass for the heat exchanger. In particular, the bypass control valve (18), the bypass lines (14), (15), (16) and (17), and the outlet control valve (21) were absent.

The material to be milled had a pasty consistency and a moisture content of 75% by weight, relative to the total amount. The material to be milled was conveyed into the mill via a twin screw unit (product feed (7)).

The temperature of the heating gas on introduction in the mill (2), by means of conduit (8), was 210–230° C., and the temperature on leaving the mill (2), by means of conduit (9) was 120° C.

In the event of a sudden loss of the feed stream of material to be milled, the intake control valve (29) and the outlet control valve (20) were immediately fully opened. As a result, the gas mixture (steam/air) in the circulation was displaced and the mill-dryer was cooled with air at ambient temperature. In addition, the burner flame was extinguished. Nevertheless, the temperature increased to 170° C. downstream of the mill and to 150° C. downstream of the filter.

Example 2

Methylhydroxyethylcellulose in the form of a water-moist material to be milled was subjected to combined milling and drying in a mill-dryer operated with circulation gas. The mill-dryer (100) corresponded substantially to FIG. 1, the bypass conduit (14) between heat exchanger (1) and mill (2) being integrated in the main gas line conduit (8) at point (54) by means of bypass conduits (14) and (17). Conduits (15) and (16) were not present.

The material to be milled had a pasty consistency and a moisture content of 75% by weight, relative to the total amount. The material to be milled was conveyed into the mill (2) via a twin screw conveyer (product feed (7)).

With the same gas throughput and the same composition of the heating gas as in Example 1, 1.3 times the amount of the pasty material to be milled was subjected to the combined milling and drying. The temperature on entering the mill (2) was 240–260° C., and the temperature on leaving the mill (2) was 120° C.

In the event of a sudden loss of the feed stream of the material to be milled, the bypass control valve (18) was immediately opened and the control valve (19) of the main gas line (12) was immediately closed. As a result, the heating gas (steam/air mixture) was no longer passed through the heat exchanger (1), but rather was bypassed through the bypass conduit 14/17. In addition, the burner flame of burner (30) was extinguished. The temperature increased to 150° C. downstream of the mill (2) and the temperature increased to 130° C. downstream of the filter (4).

With a substantially increased stream of material to be milled, it was therefore possible to achieve a safer procedure in Example 2 than in Example 1 since the temperature in the mill (2), in the cyclone separator (3) and in the filter separator (4) was substantially lower, and the inert conditions (steam/air mixture) were not eliminated.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process of both milling and drying a solvent-moist material comprising:
    (a) providing a mill-dryer apparatus comprising,
        (i) a heat exchanger having an inlet and an outlet,
        (ii) a mill having an inlet and an outlet,
        (iii) a particulate separating apparatus having an inlet and an outlet, and
        (iv) a bypass line,
        the outlet of said heat exchanger being connected to the inlet of said mill by means of a heat exchanger-mill conduit,
        the outlet of said mill being connected to the inlet of said particulate separating apparatus by means of a mill-separator conduit,
        the outlet of said particulate separating apparatus being connected to the inlet of said heat exchanger by means of a separator-heat exchanger conduit,
        said heat exchanger, mill, particulate separating apparatus, heat exchanger-mill conduit, mill-separator conduit and separator-heat exchanger conduit together defining a mill-dryer circuit, and
        said bypass line providing reversibly closeable gaseous communication between said separator-heat exchanger conduit and a down-stream portion of said mill-dryer circuit relative to said heat exchanger, said bypass line thereby providing optionally at least partial gaseous bypass of said heat exchanger,
    (b) introducing said solvent-moist material into said mill;
    (c) circulating a vapor stream throughout said mill-dryer circuit;
    (d) heating said vapor stream by means of passage through said heat-exchanger;
    (e) forwarding milled particulate material from said mill to said particulate separating apparatus by means of said vapor stream and said mill-separator conduit;
    (f) separating said particulate material from said vapor stream in said particulate separating apparatus;
    (g) forwarding said vapor stream from said particulate separating apparatus through said separator-heat exchanger conduit; and
    (h) controlling the temperature of said vapor stream by optionally forwarding at least some of said vapor stream through said bypass line.

2. The process of claim 1 wherein the material introduced into said mill is selected from at least one of polysaccharides and polysaccharide derivatives.

3. The process of claim 1 wherein the material introduced in to said mill is a cellulose derivative selected from at least one of methylcellulose, methylhydroxyethylcellulose, methylhydroxypropylcellulose, hydroxyethylcellulose and carboxymethylcellulose.

4. The process of claim 1 wherein the solvent of said solvent-moist material is water, and said vapor stream comprises one of (i) a mixture of steam and air, and (ii) a mixture of steam and at least one inert gas.

5. The process of claim 1 wherein said bypass line includes a reversibly closeable valve, said valve being operated as a function of the temperature of said vapor stream.

6. The process of claim 1 wherein the particulate material separated in said particulate separating apparatus has a particle size of less than or equal to 70 $\mu$m.

7. The process of claim 1 wherein said bypass line includes at least one reversibly closeable blow-out nozzle, said process further comprising controlling the pressure within said mill-dryer circuit by releasing excess vapor through said blow-out nozzle.

8. A mill-dryer apparatus for both milling and drying a solvent-moist material comprising:
    (i) a heat exchanger having an inlet and an outlet,
    (ii) a mill having an inlet and an outlet,
    (iii) a particulate separating apparatus having an inlet and an outlet, and
    (iv) a bypass line,
    wherein,
        the outlet of said heat exchanger is connected to the inlet of said mill by means of a heat exchanger-mill conduit,
        the outlet of said mill is connected to the inlet of said particulate separating apparatus by means of a mill-separator conduit,
        the outlet of said particulate separating apparatus is connected to the inlet of said heat exchanger by means of a separator-heat exchanger conduit,
        said heat exchanger, mill, particulate separating apparatus, heat exchanger-mill conduit, mill-separator conduit and separator-heat exchanger conduit together defining a mill-dryer circuit,
        said bypass line providing reversibly closeable gaseous communication between said separator-heat exchanger conduit and a down-stream portion of said mill-dryer circuit relative to said heat exchanger, said bypass line thereby providing optionally at least partial gaseous bypass of said heat exchanger.

9. The mill-dryer apparatus of claim 8 wherein said bypass line includes a reversibly closeable valve.

10. The mill-dryer apparatus of claim 8 wherein said bypass line includes at least one reversibly closeable blow-out nozzle, said blow-out nozzle providing a means for releasing excess vapor from said mill-dryer circuit and controlling the pressure within said mill-dryer circuit.

* * * * *